(12) United States Patent
Viviano

(10) Patent No.: US 7,818,857 B1
(45) Date of Patent: Oct. 26, 2010

(54) TUBE ALIGNMENT AND JOINER DEVICE

(76) Inventor: Anthony Viviano, 24 E. Maitland La., New Castle, PA (US) 16105

( * ) Notice: Subject to any disclaimer, the term of this patent is extended or adjusted under 35 U.S.C. 154(b) by 1029 days.

(21) Appl. No.: 11/590,472

(22) Filed: Nov. 1, 2006

(51) Int. Cl.
*B23P 19/04* (2006.01)
(52) U.S. Cl. .......................... 29/237; 29/238
(58) Field of Classification Search .............. 29/237, 29/429, 407.09, 407.1, 508, 515, 516, 517, 29/820; 285/24, 26, 34; *B23P 19/04; B25P 27/14*
See application file for complete search history.

(56) References Cited

U.S. PATENT DOCUMENTS

| | | | |
|---|---|---|---|
| 4,054,984 A * | 10/1977 | Ball et al. ..................... 29/237 |
| 4,189,817 A | 2/1980 | Moebius | |
| 4,418,458 A * | 12/1983 | Hunter ......................... 29/237 |
| 4,893,393 A * | 1/1990 | Marshall ....................... 29/237 |
| 5,305,510 A | 4/1994 | Croft et al. | |
| 5,483,731 A * | 1/1996 | Prendel et al. ................ 29/237 |
| 6,016,592 A * | 1/2000 | Lavender ...................... 29/272 |
| 6,430,792 B1 | 8/2002 | Foster et al. | |
| 2005/0120539 A1 * | 6/2005 | Tutt et al. ..................... 29/466 |

* cited by examiner

*Primary Examiner*—Joseph J Hail, III
*Assistant Examiner*—Jamal Daniel
(74) *Attorney, Agent, or Firm*—Harpman & Harpman

(57) ABSTRACT

A tube joining and loop formation device that aligns and pre-positions two ends of a synthetic resin tubular work piece for insertion onto a single internal joining plug by frictional interference thereon. The joining device clamps the tubes inwardly from its free ends in independent fixtures which are then simultaneously driven towards coupling temporarily held in a movable aligned fixture for internal engagement therewith.

7 Claims, 5 Drawing Sheets

TUBE ALIGNMENT AND JOINER DEVICE

BACKGROUND OF THE INVENTION

1. Technical Field

This device relates to tube fitting devices that secure tubes on fittings using movable jaw configurations in aligned relation to one another.

2. Description of Prior Art

Prior art devices of this type have been directed to hydraulic assembly fitting tools that hold fitting components to be joined to one another by imparting mechanical force. Such assembly tools can be seen for example in U.S. Pat. Nos. 4,189,817, 5,305,510, 5,483,731 and 6,430,792.

In U.S. Pat. No. 4,189,817 a hydraulic assembly tool for tubular fittings is disclosed having a fixed jaw and a movable jaw for a pair of fittings to be joined together.

U.S. Pat. No. 5,305,510 is directed to a hydraulic assembly tool that has a fixed jaw and a movable jaw with pre-positioning devices associated therewith.

A universal hydraulic tool can be seen in U.S. Pat. No. 5,483,731 in which a pair of jaws, fixed and movable, are provided for positioning and engaging a tube fitting onto a tube.

U.S. Pat. No. 6,430,792 claims a hydraulic tool with a fixed and movable jaw defining a swaging tool with wide shaped jaws.

SUMMARY OF THE INVENTION

A tube joining device for aligning, holding and transporting oppositely disposed flexible tubular ends of a tube to be joined together to form a loop by use of frictional engagement onto an internal fitting. The device of the invention pre-positions respective ends of a flexible synthetic resin tube section, engages and aligns and pneumatically clamps onto the tube ends. Secondary pneumatically cylinders draw the respective clamped tube ends to be joined to one another and engagement on the corresponding ends of an internal plug fitting selectively held until tube engagement occurs then the plug holder retracts out of the way and final tube joining thereon occurs in abutting relationship.

DETAILED DESCRIPTION OF THE INVENTION

Figure 1:
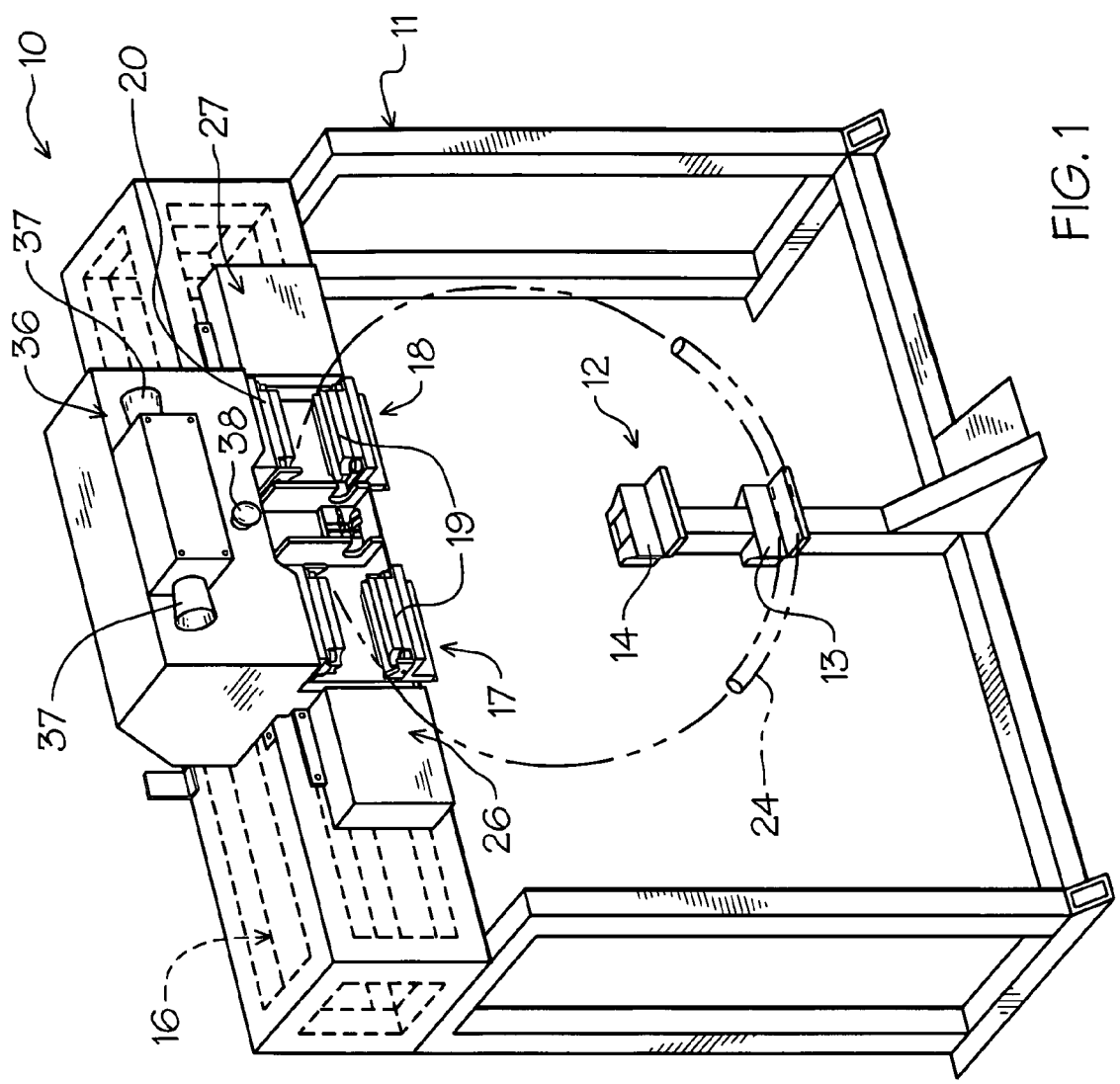
FIG. 1 is a perspective view of the tube joining device of the invention.

Referring to FIG. 1 of the drawings, a tube joining device 10 of the invention can be seen having a support and positioning frame 11 with a central product positioning jig 12 extending therefrom. The jig 12 is an upstanding element having a first and second vertically spaced bracket extensions 13 and 14 respectively onto which a tubular product 24 shown in broken lines to be joined in selective position as will be described in greater detail hereinafter.

Figure 2:
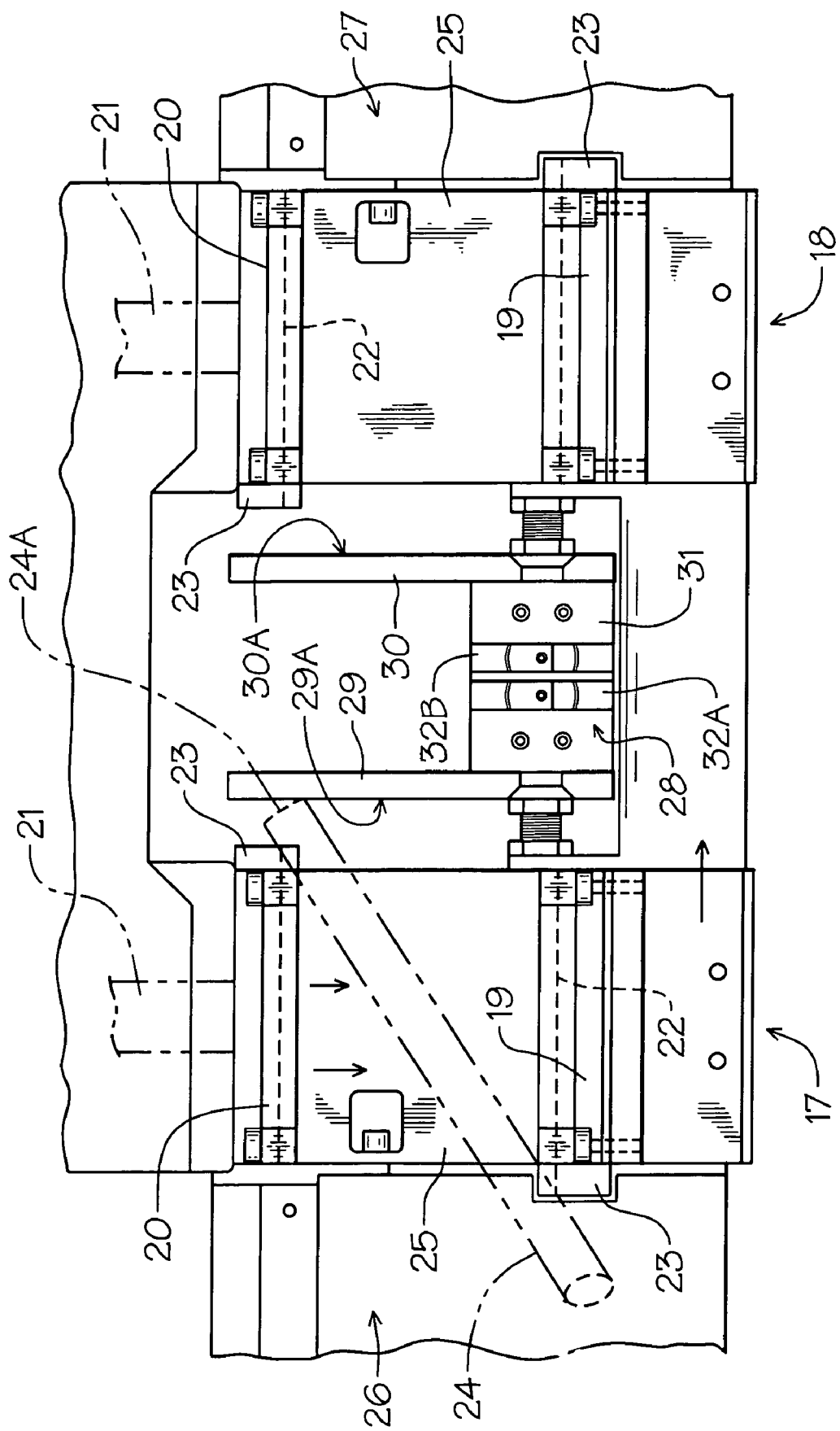
FIG. 2 is an enlarged side elevational view of the jaw portion associated therewith.

The tube joining device 10 has an upper support bracket frame 16 shown partially in dotted lines onto which a pair of movable jaw assemblies 17 and 18 are mounted. Each of the respective jaw assemblies 17 and 18 has a fixed gripping jaw 19 and a vertically aligned movable gripping jaw 20 thereon as best seen in FIG. 2 of the drawings. The gripping jaws 20 have pneumatic drive cylinders 21 which upon activation will advance the gripping jaws 20 vertically on the assemblies as indicated by directional force arrows and broken lines in FIG. 2 of the drawings towards the fixed jaws 19. Each of the respective jaws 19 and 20 have tube engagement channels 22 formed therein and secondary preliminary product engagement guides 23 thereon. The preliminary product engagement guides 23 are positioned on oppositely disposed ends of the corresponding respective jaw pairs 19 and 20 for initial engagement outboard of the jaw 20 and inboard of the fixed jaws 19 as illustrated in the jaw assembly 17 in broken lines with the tubular work product 24 positioned therein.

Each of the jaw assemblies 17 and 18 are mounted on brackets 25 which are movable horizontally towards and away from one another by respective independent pneumatic cylinder activation assemblies 26 and 27 secured to the upper support bracket frame 16 as hereinbefore described and best seen in FIG. 1 of the drawings.

A tube plug holder assembly 28 is movably secured to the upper support frame 16 for reciprocation for and aft between the respective jaw assemblies 17 and 18. The tube plug holder assembly 28 has a pair of spaced parallel tube engagement end guide plates 29 and 30 which extend from a support fitting 31 which has a pair of resilient plug retainment clips 32A and 32B, best seen in FIGS. 2 and 3 of the drawings. The tubular engagement end guide plates 29 and 30 each have a notch 33 therein inwardly of one end thereof with tapered edge surfaces 34 thereabout. The notches 33 are in aligned orientation with the hereinbefore described resilient retainment clips 32A and 32B and the respective closed jaw pairs 19 and 20 of the jaw assembly 17 and 18 during use.

Figure 4:
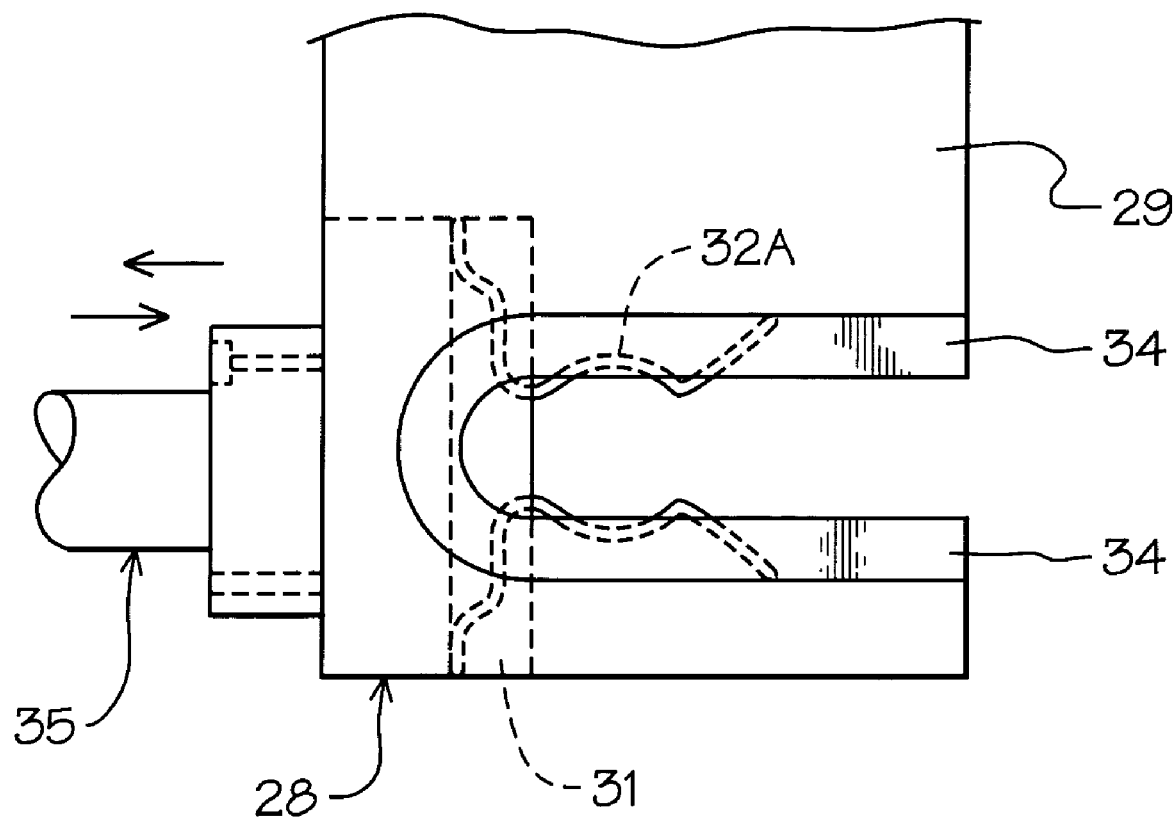
FIG. 4 is an enlarged end elevational view of a central jaw fitting retainment portion broken away for illustration.
Figure 5:
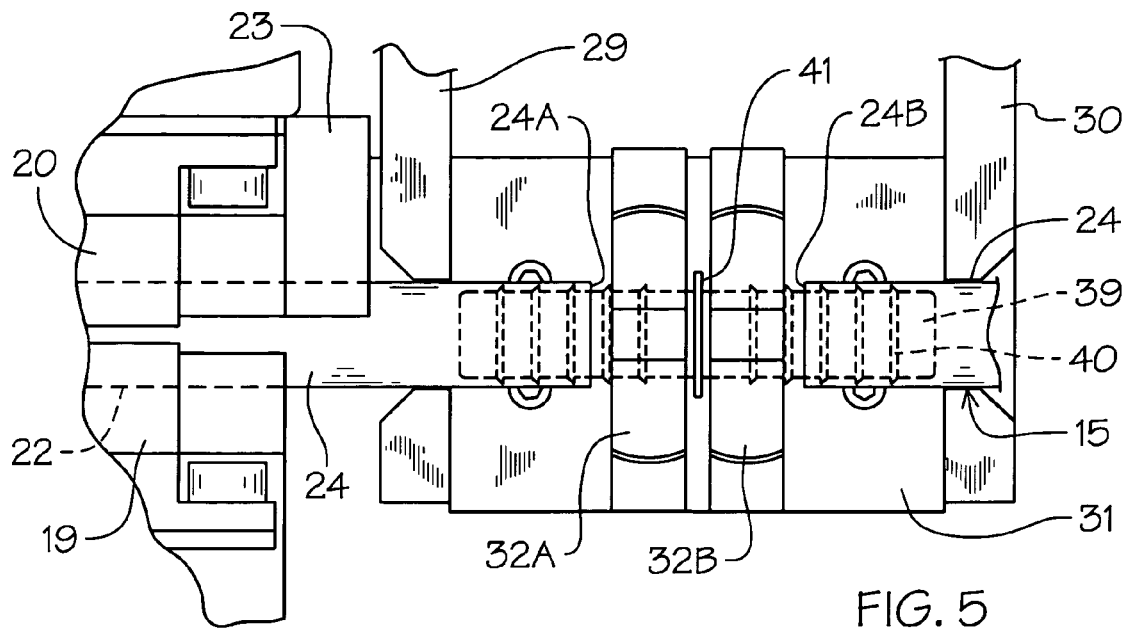
FIG. 5 is an enlarged partial side elevational view showing tube ends inserted for and joining.

The tube engagement end guide plates 29 and 30 are of sufficient longitudinal length to extend vertically beyond the plug retaining clips 32A and 32B to correspond with the respective jaw elements 20 when in open pre-activated position as illustrated in FIG. 2 of the drawings. The tube plug holder assembly 28 is secured to its own pneumatic activation cylinder assembly 35, best seen in FIG. 4 of the drawings, for trans-lateral for and aft movement between the hereinbefore described movable jaw assemblies 17 and 18.

A control activation console 36 has interdependent dual activation buttons 37 which require simultaneous depression to begin the tube joiner operational sequence as will be disclosed in greater detail hereinafter.

A source of pneumatic pressure is provided as well as a sequential control circuit for activation sequence of the hereinbefore described multiple piston and cylinder assemblies 21, 26, 27 and 35 to achieve the required coordinated interdependent jaw assembly activation and movement.

A master emergency stop button 38 is provided on the control console 36 for emergency stop required in accordance with machine operator safety protocol established within the industry as will be well known to those skilled in the art.

In operation, the tubular product 15 which is of a loop configuration, in this example, to be formed requires a specific length of tubular work product 24 to be joined together at its respective free ends 24A and 24B. The length of tubing product 24 is pre-cut to a pre-determined length which is dependent as to the desired loop size to be so formed. The tubular work product 24 in this application is preferably made of synthetic resin material of suitable walled thickness for its intended use.

Figure 3:
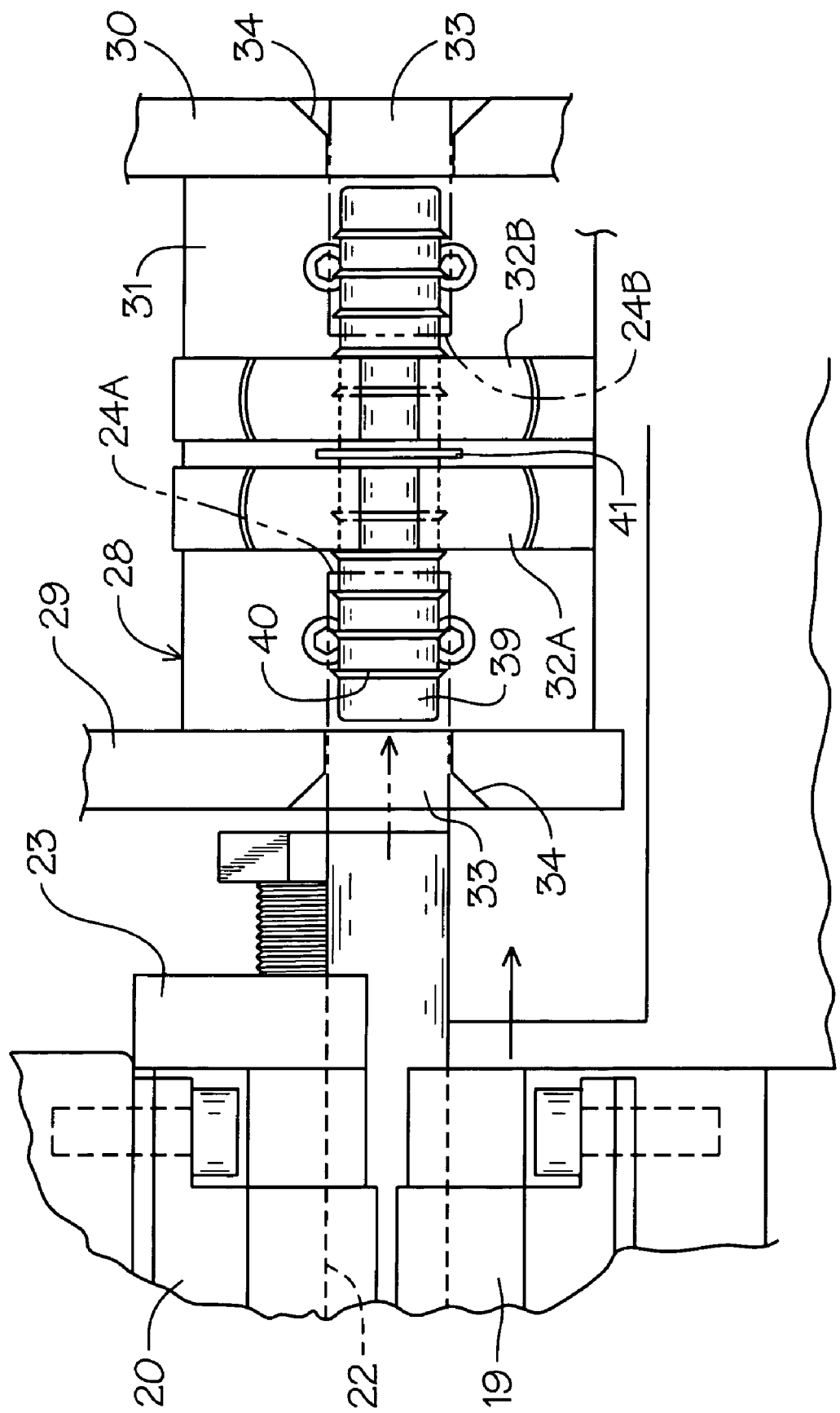
FIG. 3 is an enlarged partial side elevational view thereof with a tube engaged in said lines and partly inserted in broken lines.

In order to effectively join the free ends 24A and 24B of the tube work product 24 together, a tube joining plug 39 preferably of molded synthetic resin material is formed having a plurality of annular tapered engagement flanges 40 thereon and a central upstanding tube end engagement stop rib 41 as best seen in FIG. 3 of the drawings. The plug 39 is manually inserted by the operator (not shown) into and held by the respective retainment clips 32A and 32B of the plug holder assembly 28 in longitudinal alignment with the hereinbefore described notches 33 in the tube engagement guide plates.

The pre-cut tubular work product 24 is then loaded into the tube joining device 10 of the invention by placing same onto the positioning jig 12 and is specifically so chosen bracket extension 13 or 14 which is determined by the diameter of loop to be formed. The respective free ends 24A and 24B of the tube are then placed between the jaws 19 and 20 in the respective jaw assemblies 17 and 18. The tubular work product 24 is engaged and held in place initially by the secondary preliminary product engagement guides 23, the bracket extension position so chosen 13 or 14 and by their respective abutting of the corresponding guide plates 29 and 30 surfaces illustrated at 29A and 30A respectively.

The operator (not shown) begins the tubular joining sequence by depressing simultaneously the hereinbefore described dual start buttons. The movable jaws 20 descend gripping the tube ends 24A and 24B between the so engaged jaw pairs 19 and 20 shown sequentially in FIGS. 2-5 of the drawings. Once so gripped, the closed jaw assemblies 17 and 18 are driven horizontally towards one another by the respective hereinbefore described pneumatic cylinder assembly drives 26 and 27 forcing the respective free ends 24A and 24B of the tubular work product 24 partially onto the longitudinally aligned ends of the plug 39 simultaneously. Once initially engaged to a pre-determined depth, limit switches pause the pneumatic cylinders 26 and 27 and activate the pneumatic cylinder assembly 35 of the plug holder assembly 28 withdrawing same, releasing the plug 39 which is now firmly held within the respective ends of the tubular work product 24A and 24B as hereinbefore described.

Figure 6:
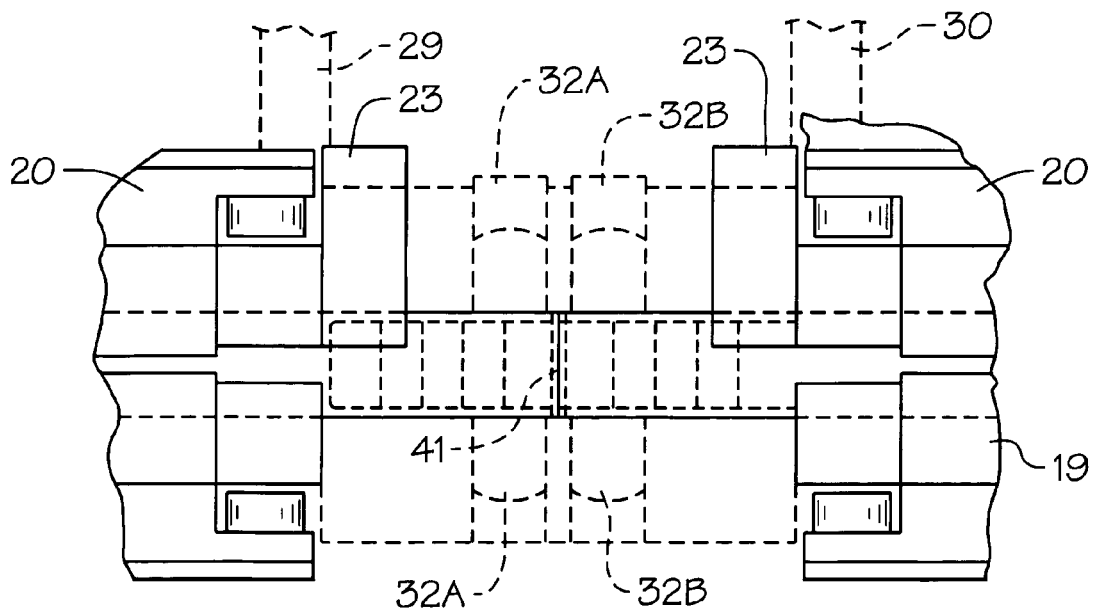
FIG. 6 is an enlarged partial side elevational view with tube end joined.

Once the tube plug holder assembly 28 has cycled back, as noted, the pneumatic cylinder assemblies 26 and 27 are reactivated completing the insertion of the free tube ends 24A and 24B onto the plug 39 as best seen in FIG. 6 of the drawings.

Respective jaws 20 are then vertically retracted by their corresponding piston and cylinder assemblies 21 releasing the tubular product 24 which is now completed into a close loop configuration and is then ejected by the re-engagement return of the tube plug holder assembly 28 from its jaw orientation with the respective jaw assemblies 17 and 18 being repositioned for the next cycle use.

It will be evident from the above description that the coordinated control activation sequence of the jaw assembly closure and tube 24 end insertion onto the plug 39 is achieved by independent multiple positional element input criteria indicated by the primary operator activation once the tubular work product 24 is positioned (loaded) into the tube joiner 10 of the invention as hereinbefore described.

It will thus be seen that a new and novel tube joining device has been illustrated and described and it will be apparent to those skilled in the art that various changes and modification may be made thereto without departing from the spirit of the invention.

Therefore I claim:

1. A tube joining device for forming a continuous tubular loop comprising, a support frame having multiple tube engagement jaw assemblies movably positioned thereon, a tube plug holder selectively positioned in spaced aligned position between said jaw assemblies, a tube engagement jig formed by said respective jaw assemblies and tube end guide plates for pre-positioning respective free ends of a tubular work piece to be joined, each of said jaw assemblies having a fixed and a vertically spaced parallel aligned movable jaw, pneumatic piston and cylinder assemblies activating said respective movable jaws for closure on the respective ends of said tubular loop work piece, secondary pneumatic and piston cylinder assemblies for advancing said closed jaw assembly simultaneously towards said tube plug holder, said closed jaw assemblies axially aligning said respective tubular work piece for integral partial insertion on a tube plug within said tube plug holder, a pneumatic piston assembly for removably positioning said tubular plug holder from between said movable jaw assemblies.

2. The tube joining device set forth in claim 1 wherein said movable and fixed jaw pairs have, tube engagement channels therewithin.

3. The tube joining device set forth in claim 1 wherein said tube plug holder has resilient clips for retaining said tube plug therewithin.

4. The tube joining device set forth in claim 1 wherein said tube end guide plates extend from said tube plug holder for tubular work piece end stop engagement.

5. The tube joining device set forth in claim 1 wherein said first pneumatic piston and cylinder assembly engages said movable jaws of said respective jaw assemblies for closure against said fixed jaws in aligned registration therewith.

6. The tube joining device set forth in claim 1 wherein said secondary pneumatic piston and cylinder assemblies secured to said support frame engage said jaw assemblies for simultaneous translateral movement thereon towards one another.

7. The tubular joining device set forth in claim 1 wherein said multiple pneumatic piston and cylinder assemblies are activated by sequential control criteria configurations determined by sequential respective jaw assembly and tube plug holder positions relative to one another.

* * * * *